June 12, 1951  P. L. LOEWE  2,556,698
PISTON CONSTRUCTION
Filed Feb. 5, 1945  2 Sheets-Sheet 2

Inventor
Peter L. Loewe
by Parker & Carter
Attorneys

Patented June 12, 1951

2,556,698

UNITED STATES PATENT OFFICE 2,556,698

PISTON CONSTRUCTION

Peter L. Loewe, Chicago, Ill., assignor to
G. F. Goodson, Detroit, Mich.

Application February 5, 1945, Serial No. 576,217

4 Claims. (Cl. 309—4)

My invention relates to an improvement in pistons and cylinders and has for one purpose to provide cushioning means for use with a piston.

Another purpose is to provide a piston and cylinder with means for cushioning the stroke of the piston in each direction.

Another purpose is to provide fluid cushioning means for the stroke of a piston.

Other purposes will appear from time to time in the course of the specification and claims.

Figure 1:
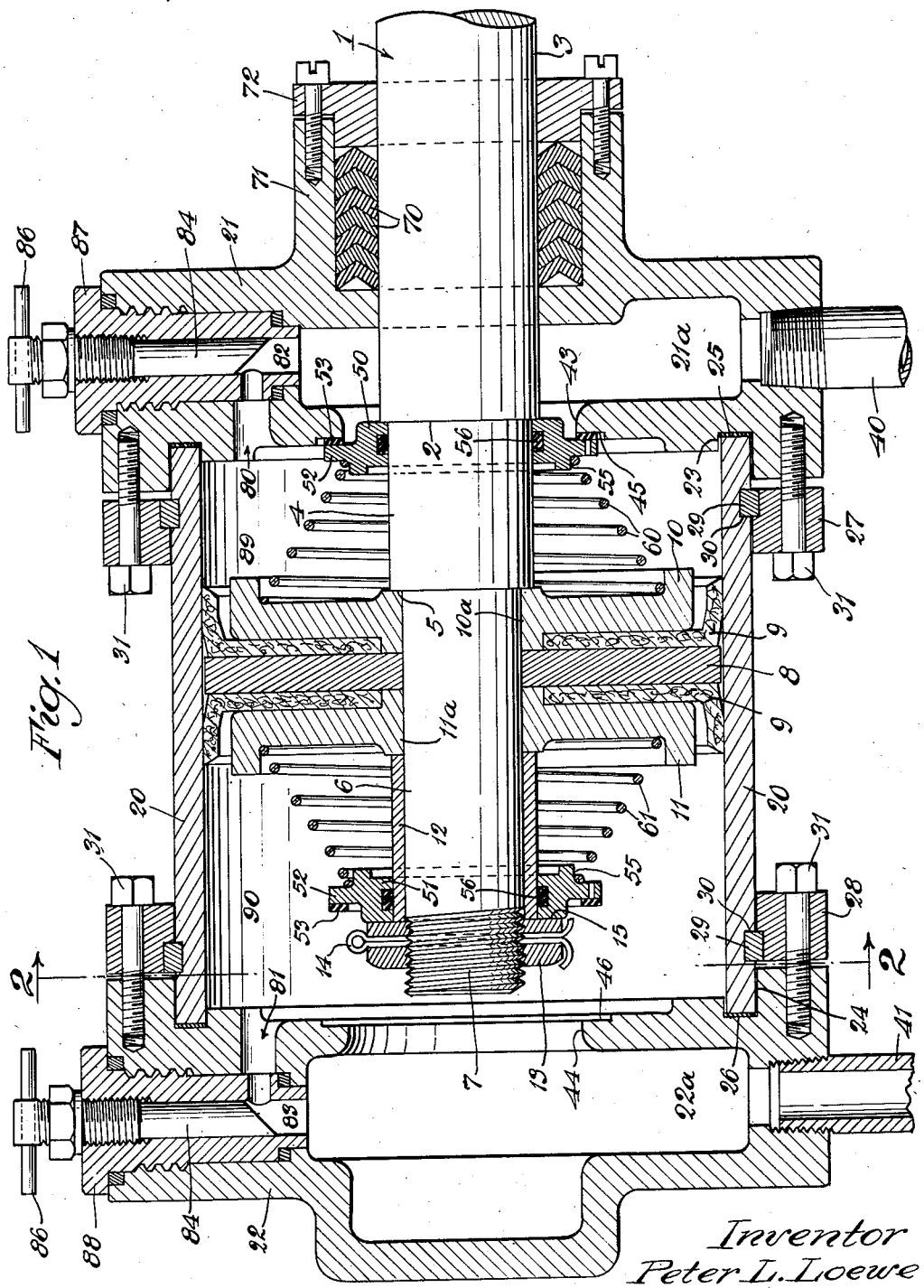
Figure 2:
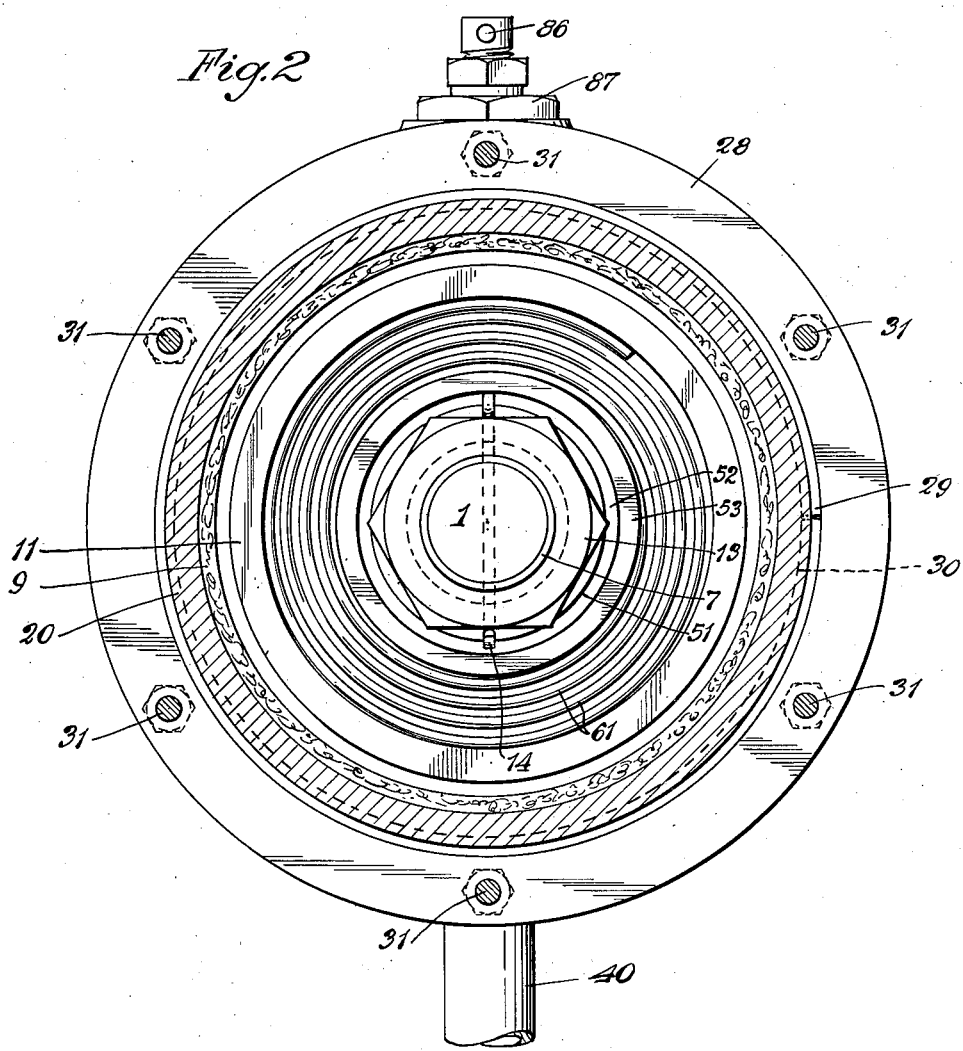

I illustrate my invention more or less diagrammatically in the accompanying drawings wherein:

Figure 1 is an axial longitudinal section; and
Figure 2 is a section on the line 2—2 of Figure 1.

Like parts are indicated by like symbols throughout the specification and drawings.

Referring to the drawings 1 generally indicates a piston shaft of any suitable metal. The shaft is provided with a ledge 2 separating a portion of maximum diameter 3 from a portion of intermediate diameter 4. A second ledge 5 separates the portion of intermediate diameter from a portion of minimum diameter 6, herein shown as screw threaded as at 7. 8 generally indicates a centrally apertured spacer disc shown as surrounding the shaft portion 6. At each side thereof is a flexible cup 9 of any suitable material such as a synthetic rubber or leather. 10 and 11 are compression cups of metal or the like having portions 10a and 11a engaging and conforming to the exterior of the shaft portion 6. The portion 10a is shown as abutting against the shoulder 5. 12 is any suitable thrust sleeve one end of which abuts against the portion 11a of the cup 11. 13 is any suitable nut on the thread 7 of the piston shaft 1. It may be tightened to urge the sleeve 12 to the right, referring to the position of the parts as they appear in Figure 1. As a result the piston structure as a whole is urged against the ledge 5 and kept in the position in which it is shown in Figure 1. The nut 13 may be held in position, when tightened, by any suitable means such as the cotter pin 14. It will be observed that the nut has a face 15 which extends outwardly beyond the end of the sleeve 12.

The cylinder in which my piston is employed does not of itself form part of the present invention. I illustrate, however, a cylindrical side wall 20 and chambered ends or heads generally indicated as 21 and 22. Each such end or cylinder head has any suitable inner chamber or passage 21a, 22a for the passage of the fluid delivered to and from the cylinder. The members 21 and 22 may be circumferentially channeled as at 23, 24 to receive the opposite edges of the cylinder wall 20. 25, 26 indicate any suitable gaskets. The assembly may be held together for example by employing securing rings 27, 28 which are held against movement outwardly toward the ends of the cylinder by any suitable abutment means such as the split rings 29 seated in external channels 30. Any suitable securing screws 31 may be employed, which pass through the rings 27, 28 and into the cylinder head portions 21 and 22. Any suitable fluid inlets and outlets may be employed, including for example the ducts 40 and 41. The chambers 21a and 22a are in communication with the space within the cylinder through apertures 43, 44 respectively. Each said aperture may be formed with an inwardly faced annular recess 45, 46, the wall of which is substantially perpendicular to the axis of the piston 1. Slidable along the shaft portion 4 and the exterior of the sleeve 12 respectively are sealing rings 50 and 51. Each ring includes an outwardly extending annular flange 52 carrying on its exterior surface a sealing gasket 53 of any suitable material such as synthetic rubber. Each said ring is also provided with an annular spring abutment 55 and any suitable sealing means 56, whereby leakage between the sealing ring and the piston shaft is prevented. The sealing ring 50 is urged toward the ledge 2 by the light coil spring 60, the coils of which conform generally to conic shape, with the maximum diameter such that the large end of the spring fits within the cavity of the cup 10 and the portion of minimum diameter surrounds the spring abutment 55. The sealing ring 51 is similarly urged against the face 15 of the nut 13 by the spring 61.

The cylinder head 21 has inserted in it a bushing 87. In similar fashion the cylinder head 22 has inserted in it a bushing 88. These bushings permit substantially free communication between the open portion 89 of the cylinder head 21 through passage 82 to the open space 21a. In like fashion bushing 88 permits substantially free intercommunication between the space 90 through the passage 83 into opening 22a. Inserted in the bushings 87, 88 and, held within it, are throttling devices 84 actuated by means of the suitable lever such as 86. A rotation of these devices permits the throttling or closing of the apertures leading between spaces 82 and 80, or between 83 and 81 to vary the rate of flow of the liquid from the space between the piston and the cylinder head after the sealing ring 50 is in position, to control the hydraulic or pneumatic cushioning effect.

As the piston shaft 1, at the end of its stroke begins to return toward the left due to admission of fluid through 40 to 21a and through 82 and 80 into space 89, referring to the position of the parts as shown in Figure 1, the fluid will exert pressure on ring 50 urging it toward the left and thereby breaking the seal between the synthetic rubber gasket 53 and the seat 45. Hence the full volume of fluid will be transmitted through passage 43, thereby causing the piston to move rapidly to the left. The throttling device 84 thereafter is substantially inoperative.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:

I illustrate a piston and cylinder in which a piston is mounted on the end of the piston shaft 1 and is reciprocated within a cylinder having a centrally ported chambered cylinder head at each end. In Figure 1 it will be understood that the piston and shaft are moving toward the right, referring to the position of the parts as shown in Figure 1, and that the sealing ring 50 has moved sufficiently to the right to cause the sealing gasket 53 to engage the sealing face 45 of the cylinder head. Any further movement of the piston to the right will build up hydraulic or pneumatic pressure against the sealing ring 50, since the fluid, instead of passing through aperture 43 now must pass through the restricted passages 81 and 82. Leakage will be prevented by the gasket 53 and the seal 56. The portion 4 of the piston shaft 1 will move to the right through the central aperture of the sealing ring 50. There being no perceptible leakage around the sealing ring 50, the fluid contained within the space between the cylinder head 21 and the piston will be forced out past the needle valve, and thence through 21a into the passage or pipe 40. As the piston 10 moves toward the cylinder head 21 the fluid pressure increases. The result is an adequate hydraulic or pneumatic cushioning of the piston in its movement toward the cylinder head and the prevention of any pounding. As the piston shaft 1, at the end of its stroke begins to return toward the left, due to admission of fluid through 40 to 21a, referring to the position of the parts as shown in Figure 1, the ring 50 will be lifted off its seat 45 and fluid will be freely admitted through passage 43.

It will be understood that the control mechanism for controlling the flow of the fluid is not part of the present invention and is not illustrated herein. In considering a typical piston movement, assume that the piston structure is moving to the right, referring to the position of the parts in Figure 1. After the ring 50 has sealed against the cylinder head, the only escape for the fluid is through the passage 80 and the throttleable outlet 82. Thus a hydraulic or pneumatic cushion is provided for the piston. After a period of piston movement with throttled flow, the piston or cup portion 10 eventually may seat against the cylinder. Appropriate means, not herein shown, are then employed for reversing the flow of the fluid, the fluid being delivered inwardly along the passage 40 into the space 21a. The ring 50 is thereby subjected to pressure and is urged to the left from the ledge 2, against the thrust of the relatively weak spring 60, and the fluid flows through the annular opening about the shaft 1 and is able to operate directly against the piston. The piston is thereby moved to the left, still referring to the parts as shown in Figure 1. The same process is repeated at the opposite end of the piston stroke, as the piston continues its movement to the left, and the fluid is expelled to and through the space 20a and the duct 41. When the ring 52 engages its opposed cylinder head, the only fluid escape is through the passages 81 and 83, and a hydraulic or pneumatic cushion is thereby formed, which cushions the movement of the piston to the left until the cup or piston portion 11 engages the opposed cylinder head. The same succession of movement is continued during the normal use of the piston. The springs 60 and 61 need be merely strong enough to overcome the friction of the ring 50 and its seal 56 against the piston shaft 4, or to overcome the friction of the sealing ring 51 and its seal 56 against the sleeve 12.

It will be understood that any suitable means for sealing the piston shaft 1 may be employed. I illustrate for example a plurality of seals or chevron rings 70 positioned within the sleeve 71 and held by the outer cover plate or ring 72, as shown for example in Figure 1.

I claim:

1. In a piston structure, a shouldered piston shaft having an end portion of minimum diameter, a portion of maximum diameter and an intermediate portion of intermediate diameter with shoulders between said portions, a piston on said portion of minimum diameter, abutting against one of said shoulders, means for locking it against said shoulder, including a spacing sleeve surrounding the end portion of said shaft and means for locking said spacing sleeve in position, a sealing ring slidable on said spacing sleeve and yielding means adapted normally to urge it to the limit of its movement, along said spacing sleeve, away from the piston, a second sealing ring slidably mounted on the intermediate portion of said shaft and adapted to abut against a shoulder of said shaft and yielding means adapted normally to urge it away from said piston and against said shoulder.

2. In a piston structure, a shouldered piston shaft having an end portion of minimum diameter, a portion of maximum diameter and an intermediate portion of intermediate diameter with shoulders between said portions, a piston on said portion of minimum diameter, abutting against one of said shoulders, means for locking it against said shoulder, including a spacing sleeve surrounding the end portion of said shaft and means for locking said spacing sleeve in position, including a locking member abutting against and of greater diameter than said spacing sleeve, a sealing ring slidable on said spacing sleeve and yielding means adapted normally to urge it to the limit of its movement, along said spacing sleeve, away from the piston, and against said locking member, a second sealing ring slidably mounted on the intermediate portion of said shaft and adapted to abut against a shoulder of said shaft and yielding means adapted normally to urge it away from said piston and against said shoulder.

3. In a piston structure, a piston rod, an intermediate member thereon, a pair of outwardly recessed abutment members, one on each side of the intermediate member, all three members having a diameter less than the diameter of the piston assembly, the abutment member being angularly recessed on the sides opposite to the intermediate member, flexible packing cups, one contained between each abutment member and the intermediate member and having cylinder-engaging elements overlying the abutment members, the piston rod being shouldered to engage one of the abutment members, a sleeve making a sliding fit with the piston rod to engage the other abutment member, the outer diameter of the sleeve being substantially the same as the outer diameter of the piston rod beyond the shoulder, means for longitudinally displacing the sleeve to compress the abutment members and the intermediate member against the shoulder, packing rings, one slidable on the piston rod, the other on the sleeve, springs encircling the piston rod interposed between each abutment member and the packing ring, the springs being adapted, when compressed, to be received in the angular recesses on the abutment members.

4. In a piston structure, a piston rod, an intermediate member thereon, a pair of outwardly recessed abutment members, one on each side of the intermediate member, all three members having a diameter less than the diameter of the piston assembly, the abutment members being angularly recessed on the sides opposite to the intermediate member, flexible packing cups, one contained between each abutment member and the intermediate member and having cylinder-engaging elements overlying the abutment members, the piston rod being shouldered to engage one of the abutment members, a sleeve making a sliding fit with the piston rod to engage the other abutment member, the outer diameter of the sleeve being substantially the same as the outer diameter of the piston rod beyond the shoulder, means for longitudinally displacing the sleeve to compress the abutment members and the intermediate member against the shoulder, packing rings, one slidable on the piston rod, the other on the sleeve, springs encircling the piston rod interposed between each abutment member and the packing ring, the springs being adapted, when compressed, to be received in the angular recesses on the abutment members, the packing members comprising angular rings slidable on the piston rod and sleeve, and having packing surfaces arranged on the outer periphery thereof adapted to engage and make a tight seal with a sealing surface perpendicular to the piston rod.

PETER L. LOEWE.

REFERENCES CITED

The following references are of record in the file of this patent:

UNITED STATES PATENTS

| Number | Name | Date |
|---|---|---|
| 248,908 | Baldwin | Nov. 1, 1881 |
| 559,526 | Heermans | May 5, 1896 |
| 971,143 | Randall | Sept. 27, 1910 |
| 1,604,548 | Dapron | Oct. 26, 1926 |
| 2,089,556 | Jackson | Aug. 10, 1937 |
| 2,283,460 | Pumphrey | May 19, 1942 |
| 2,347,346 | Wright | Apr. 25, 1944 |

FOREIGN PATENTS

| Number | Country | Date |
|---|---|---|
| 9,615 | Great Britain | 1904 |
| 420,843 | Great Britain | Dec. 10, 1934 |
| 107,901 | Australia | July 20, 1939 |
| 620,864 | France | 1927 |